United States Patent Office 3,499,967
Patented Mar. 10, 1970

3,499,967
COMPOSITIONS FOR COMBATTING *TRICHOMONAS VAGINALIS* INFECTIONS CONTAINING 1-METHYL-5-ISOPROPYL-2 NITROIMIDAZOLE
Giancarlo Lancini, Pavia, and Ettore Lazzari, Milan, Italy, assignors to Lepetit S.p.A., Milan, Italy
No Drawing. Continuation-in-part of application Ser. No. 496,184, Oct. 14, 1965. This application Aug. 1, 1967, Ser. No. 657,514
Claims priority, application Great Britain, Aug. 12, 1964, 32,843/64
Int. Cl. A61k *27/00, 21/00*
U.S. Cl. 424—273   6 Claims

ABSTRACT OF THE DISCLOSURE

The application discloses the exceptionally high activity of 1-methyl-5-isopropyl-2-nitroimidazole against infections from *Trichomonas vaginalis* and related microorganisms. In this respect the compound is superior to all known 2-nitro-imidazole derivatives.

---

This application is a continuation-in-part of our copending application Ser. No. 496,184, filed Oct. 14, 1965, now U.S. Patent 3,420,842, which in turn is a continuation-in-part of our application Ser. No. 470,888, filed July 9, 1965, now abandoned.

This invention is concerned with a substance having an exceptionally high activity against *Trichomonas vaginalis* and related microorganisms.

More particularly, the compound with which this invention is concerned is 1-methyl-5-isopropyl-2-nitroimidazole of the formula

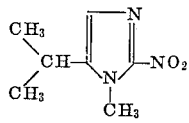

In our above mentioned copending application a novel process is described for the preparation of the antibiotic azomycin, i.e. 2-nitroimidazole, and its homologues bearing alkyl groups into one or more of the positions 1, 4 and 5. The process consists in contacting the corresponding 2-aminoimidazole with about an equimolecular amount of an alkali metal nitrite in concentrated fluoboric acid and treating the resulting solution with an excess over an equimolecular amount of an alkali metal nitrite in water in the presence of copper powder as the catalyst.

While it is apparent that the above process applies equally well to all possible 2-nitroimidazole homologues, which in a variable degree are provided with antifungal activity, it has been now ascertained that a particular compound of the class is by far superior to all other homologue substances and also to all previously known and described nitroimidazole derivatives.

The problem of handling therapeutically trichromoniasis has always been a difficult task. Although in very recent times a lot of new chemotherapeutic agents has been claimed to be active, the most promising results have been obtained with recently developed imidazole derivatives. However, some of the compounds which were found active in vitro, failed to give useful results in vivo; and even when a useful activity in vivo was present, the compounds were in most cases provided with a comparatively high toxicity which prevented long range therapy of the infection. It is known that therapy of trichomoniasis must be prolonged, in view of the fact that re-infections are a very common occurrence. Thus, the search for new agents, devoid of toxicity and with a sufficient degree of effectiveness is still being carried out and meets with considerable difficulties.

As above stated, our invention resides in the fact that 1-methyl-5-isopropyl-2-nitroimidazole shows an unusual degree of anti-trichomonas activity, as compared with other homologues of the nitroimidazole series. While practically all 2-nitroimidazoles embraced by the generic formula of our copending application Ser. No. 496,184, of which this is a continuation-in-part, have been found equally effective in inhibiting in vitro the growth of *Trichomonas vaginalis*, when tests in the animals are carried out, the effectiveness of 1-methyl-5-isopropyl-2-nitroimidazole is decidedly superior, and renders it a compound of choice for the clinical treatment of trichomonas infections. The following table shows the practical equivalency of 2-nitroimidazoles in vitro.

| Compound (2-nitroimidazole): | M.i.c. ($\gamma$/ml.) on *Trichomonas vaginalis* |
|---|---|
| 1-methyl-5-isopropyl | 5 |
| 4(5)-methyl | 5 |
| 4(5)-ethyl | 20 |
| 4(5)-propyl | 10 |
| 1,5-dimethyl | 5 |
| 1-methyl-5-ethyl | 10 |
| 1-methyl-5-propyl | 20 |
| 1-methyl-5-butyl | 10 |
| 1,4-dimethyl | 10 |
| 1-methyl | 50 |
| 4(5)-isopropyl | 10 |
| 1,5-diethyl | 10 |

On the other hand, while it is appreciated from the above table that many nitroimidazoles show a useful anti-trichomonas activity in vitro, it has been discovered that when the same compounds are tested in vivo, as stated above, the only derivative which maintains an exceptionally high activity coupled with low toxicity is 1-methyl-5-isopropyl-2-nitroimidazole. The following table gives the oral dose effective in preventing in mice trichomonas infection in 50 percent of the animals treated. The oral $LD_{50}$ is also given, followed by the therapeutic index $LD_{50}/ED_{50}$.

| Compound (2-nitroimidazole) | $ED_{50}$, mg./kg. | $LD_{50}$ mg./kg. | $LD_{50}/ED_{50}$ |
|---|---|---|---|
| 1-methyl-5-isopropyl | 2.6 | 265 | 102 |
| 4(5)-methyl | 14.3 | 152 | 10.6 |
| 4(5)-ethyl | 13.0 | 212 | 16.3 |
| 4(5)-propyl | 27.3 | 149 | 5.5 |
| 1,5-dimethyl | 10.5 | 246 | 23.4 |
| 1-methyl-5-ethyl | 9.8 | 372 | 38.0 |
| 1-methyl-5-propyl | 26 | | |
| 1-methyl-5-butyl | 32 | | |
| 1,4-dimethyl | >40 | 39 | <1.0 |
| 1-methyl | 45 | 126 | 2.8 |
| 4(5)-isopropyl | 30 | | |
| 1,5-diethyl | 19.7 | | |

Another important property of 1-methyl-5-isopropyl-2-nitroimidazole is that it is excreted unaltered in the urine in a high percentage of the administred oral dose. This facilitates treatment of trichomonas infections in the urinary tract, which is the ordinary situs of infection. The following table gives the urine levels found at different intervals after oral administration of 30 mg./kg. of the drug to mice (ten mice treated).

| Hours after administration | | | | | | Total amount excreted |
|---|---|---|---|---|---|---|
| 0-2, | | 2-4, | | 4-8, | | |
| $\gamma$/ml. | Total | $\gamma$/ml. | Total | $\gamma$/ml. | Total | |
| 80 | 480 | 138 | 828 | 83 | 664 | 1,972 |

The most suitable way of administration of 1-methyl-5-isopropyl-2-nitroimidazole are the oral route, in the form of tablets, and the topical one, such as by the use of vaginal suppositories. In the following examples some formulations are given as an indication of useful pharmaceutical compositions. A typical chemical preparation of the compound is also given, although the process is quite similar to the one described in the basic application.

The useful doses for therapeutical purposes may vary within a broad range, according to the severity of the infection, and treatment may be prolonged for several days, due to the very low toxicity. Usually, oral unit doses of 0.02–0.5 g. and topical unit doses of 0.1–1 g., 3–4 times daily, are sufficient to achieve complete relief after 2–7 days. Higher doses and more prolonged therapy may be however applied safely, if necessary.

EXAMPLE 1

Preparation of 1-methyl-5-isopropyl-2-nitroimidazole

To a soluiton of 22.5 g. of 1-methyl-5-isopropyl-2-aminoimidazole hydrochloride, 65 ml. of water and 111 ml. of 50% fluoboric acid, cooled to about −20° C., a solution of 9.3 g. of sodium nitrite in 40 ml. of water is gradually added with stirring. The mixture is then poured into 2500 ml. of water containing 88.2 g. of sodium nitrite and 27.1 g. of copper powder. After 2 hours the solution is filtered, extracted with diethyl ether, the ether extract is dried over anhydrous sodium sulfate and concentrated to a small volume. On cooling a bright yellow precipitate forms and is collected and dried. Yield 15 g. (70%) of 1-methyl-5-isopropyl-2-nitroimidazole, M.P. 83–84° C. (from diethyl ether).

EXAMPLE 2

A vaginal suppository is prepared from the following ingredients:

|   | G. |
|---|---|
| 1-methyl-5-isopropyl-2-nitroimidazole | 0.3 |
| Suppository mass Cao—CR 3061 | 3 |
| Paraffine | 0.015 |

The suppository mass and the paraffine are heated to fusion. Separately, the active substance is fine powdered, then micronized and passed through a sieve of 125 mash/inch. The micronized powder is added to the fused mass under careful stirring, then the warm mass is poured into a form and cooled.

EXAMPLE 3

A tablet for oral administration is prepared from the following ingredients:

|   | G. |
|---|---|
| 1-methyl-5-isopropyl-2-nitroimidazole | 0.2 |
| Starch | 0.05 |
| Magnesium stearate | 0.01 |
| Talc | 0.02 |

The four substances are thoroughly mixed and tabletted.

Other obvious modifications of this method of preparing tablets may be used. While dextrins may be for instance substituted for starch, and stearic acid for magnesium stearate. All these preparations are within the ordinary skill of those competent in manufacturing pharmaceutical compositions.

We claim:

1. A composition for combatting, *Trichomonas vaginalis* infections, containing as the active ingredient an effective proportion of 1-methyl-5-isopropyl-2-nitroimidazole together with a pharmaceutically acceptable diluent.

2. A composition as in claim 1, containing from 0.02 to 1.0 g. of 1-methyl-5-isopropyl-2-nitroimidazole together with a pharmaceutically acceptable diluent in dosage unit form.

3. An oral composition as in claim 1, containing from 0.02 to 0.5 g. of 1-methyl-5-isopropyl-2-nitroimidazole together with a pharmaceutically acceptable solid diluent in dosage unit form.

4. An oral composition as in claim 3, wherein the composition is in the form of a tablet.

5. A topical composition as in claim 1, containing from 0.1 to 1.0 g. of 1-methyl-5-isopropyl-2-nitroimidazole together with a pharmaceutically acceptable solid diluent in dosage unit form appropriate for topical preparations.

6. A topical composition as in claim 5, wherein the composition is in the form of a vaginal suppository.

References Cited

UNITED STATES PATENTS

| 3,255,201 | 6/1966 | Beaman et al. | 167—65.2 |
| 3,287,468 | 11/1966 | Beaman et al. | 167—65.2 |

ALBERT T. MEYERS, Primary Examiner

J. D. GOLDBERG, Assistant Examiner